United States Patent
Ide et al.

(10) Patent No.: US 11,112,760 B2
(45) Date of Patent: Sep. 7, 2021

(54) CONTROL DEVICE, CONTROL METHOD AND COMPUTER READABLE MEDIUM FOR CONTROLLING PLANT BASED ON PREDICTION MODEL AND CONSTRAINT CONDITION

(71) Applicant: MITSUBISHI HEAVY INDUSTRIES, LTD., Tokyo (JP)

(72) Inventors: Kazunari Ide, Tokyo (JP); Takaharu Hiroe, Tokyo (JP); Ryo Sase, Tokyo (JP); Yoshikatsu Ikawa, Tokyo (JP); Toshio Ishiwaki, Kanagawa (JP); Tomohiro Doi, Kanagawa (JP); Hiroshi Kitayama, Kanagawa (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 259 days.

(21) Appl. No.: 16/387,120

(22) Filed: Apr. 17, 2019

(65) Prior Publication Data
US 2019/0324414 A1 Oct. 24, 2019

(30) Foreign Application Priority Data
Apr. 19, 2018 (JP) .............................. JP2018-080583

(51) Int. Cl.
G05B 19/042 (2006.01)
G06N 5/02 (2006.01)

(52) U.S. Cl.
CPC ............. *G05B 19/042* (2013.01); *G06N 5/02* (2013.01); *G05B 2219/2639* (2013.01)

(58) Field of Classification Search
None
See application file for complete search history.

(56) References Cited

U.S. PATENT DOCUMENTS 5,347,446 A * 9/1994 Iino ...................... G05B 13/048
700/29
5,477,449 A * 12/1995 Iino ...................... G05B 13/048
700/29

(Continued)

FOREIGN PATENT DOCUMENTS

| JP | 2007-257376 | 10/2007 |
|----|-------------|---------|
| JP | 4627509     | 2/2011  |

(Continued)

OTHER PUBLICATIONS

Peng et al. 'Combinatorial Optimization of Pulverizers for Blended-coal-fired Power Plant' 2011 International Conference on Computer Distributed Control and Intelligent Environmental Monitoring, pp. 413-418, IEEE 2011.*

(Continued)

*Primary Examiner* — Bernard G Lindsay
(74) *Attorney, Agent, or Firm* — Wenderoth, Lind & Ponack, L.L.P.

(57) ABSTRACT

A control device (70) of a plant which controls operation amounts of a plurality of types of equipment constituting the plant, the control device includes a prediction model deriving unit (71) that derives a prediction model from which a monitoring target value is output, an adjustment amount calculating unit (72) that calculates adjustment amounts of operation amounts in the case where the monitoring target value becomes a desired value and calculates differences between the operation amounts of existing control and the calculated operation amounts as first adjustment amounts, a constraint condition setting unit (73) that sets constraint conditions based on a measurement value and operation conditions of the plant 1, and an operation amount calculating unit (74) that calculates second adjustment amounts to which the constraint conditions are applied and calculates a plurality of the adjusted operation amounts based on each of the calculated second adjustment amounts.

8 Claims, 9 Drawing Sheets

(56) References Cited

U.S. PATENT DOCUMENTS

| | | | | |
|---|---|---|---|---|
| 2004/0088060 A1* | 5/2004 | Renou | .................. | F02C 9/28 |
| | | | | 700/30 |
| 2007/0142975 A1* | 6/2007 | Piche | .................. | H02J 3/38 |
| | | | | 700/286 |
| 2007/0250215 A1* | 10/2007 | Jia | .................. | G05B 13/048 |
| | | | | 700/274 |
| 2012/0245747 A1* | 9/2012 | Kumar | .................. | F01K 23/067 |
| | | | | 700/288 |
| 2013/0030573 A1* | 1/2013 | Mercangoez | .................. | F23K 1/00 |
| | | | | 700/275 |
| 2015/0286192 A1* | 10/2015 | Morrow | .................. | G05B 13/048 |
| | | | | 700/29 |

FOREIGN PATENT DOCUMENTS

| | | |
|---|---|---|
| JP | 4665815 | 4/2011 |
| JP | 5503563 | 5/2014 |

OTHER PUBLICATIONS

Song et al. 'Constraint-Based Control of Boiler Efficiency: A Data-Mining Approach', IEEE Transactions on Industrial Informatics, vol. 3, No. 1, Feb. 2007.*

* cited by examiner

CONTROL DEVICE, CONTROL METHOD AND COMPUTER READABLE MEDIUM FOR CONTROLLING PLANT BASED ON PREDICTION MODEL AND CONSTRAINT CONDITION

BACKGROUND OF THE INVENTION

1. Field of the Invention

The present invention relates to a control device of a plant, a plant, a control method of a plant, and a computer-readable storage medium storing a control program of a plant.

2. Description of Related Art

A plant (such as, for example, a power generation plant) is controlled by a control device provided at the plant. The control device of the plant performs control by calculating an operation signal using a measurement value, or the like, indicating an operation state of the plant and providing the operation signal to the plant as a control command.

For example, the Publication of Japanese Patent No. 4627509 (hereinafter, referred to as "JP 4627509") discloses a control device of a plant including an operation signal generating unit that calculates an operation signal, a learning unit that learns a model for the control device of the plant to simulate control characteristics of the plant, and an operation method of the plant, or the like. The operation signal generating unit calculates an operation signal with respect to the plant using a measurement signal which is an operation state amount of the plant and learning information data. The learning unit sets a limit value of a change width of the operation signal per unit time as constraint conditions of learning and learns the operation method of the plant using the model.

Typically, at a boiler of the plant, a plurality of devices such as burners and air injection devices are provided. Media (air and fuel) to be supplied to the devices (such as the respective burners and the respective air injection devices) is divided into a plurality of media from one supply source, and the media are equally distributed to the respective devices. Concerning this, the inventors have gained an insight that by changing distribution of amounts of fuels to be supplied to the plant and distribution of amounts of air, an amount of included substance such as $NO_x$ in a combustion exhaust gas, which affects an environment, also changes.

However, in the invention disclosed in JP 4627509, change of distribution of amounts of fuels and distribution of amounts of air to a plurality of burners and air ports have not been studied. Therefore, there is a problem that a technique of efficiently determining the distribution has not been established.

In the invention disclosed in JP 4627509, because the limit value of the change width of the operation signal per unit time is used as the constraint conditions, there is a problem that an application range of the constraint conditions is narrow.

The present invention has been made in view of such circumstances, and is directed to providing a control device of a plant which can efficiently determine distribution of media which are divided into a plurality of media and supplied to a plurality of devices from a supply source, a plant, a control method of a plant and a computer-readable storage medium storing a control program of a plant.

BRIEF SUMMARY OF THE INVENTION

To solve the above-described problems, a control device of a plant, a plant, a control method of a plant and a computer-readable storage medium storing a control program of a plant of the present disclosure employ the following solutions.

A control device of a plant according to one aspect in some embodiments of the present disclosure is a control device of a plant which controls operation amounts of a plurality of types of equipment constituting the plant, the control device including a prediction model deriving unit that derives a prediction model to which a measurement value measured at the plant is input, and from which a monitoring target value which is a value to be monitored is output, an adjustment amount calculating unit that calculates the operation amounts of a plurality of types of the equipment in the case where the monitoring target value which is to be output becomes a desired value, and calculates differences between the operation amounts of existing control and the calculated operation amounts as first adjustment amounts, a constraint condition setting unit that sets a constraint condition of the operation amounts of a plurality of types of the equipment based on the measurement value and an operation condition of the plant when the measurement value is measured, and an operation amount calculating unit that calculates second adjustment amounts obtained by correcting the first adjustment amounts by applying the set constraint conditions for each of a plurality of types of the equipment and calculates a plurality of the adjusted operation amounts based on each of the calculated second adjustment amounts.

According to the present aspect, by calculating the adjustment amounts of the operation amounts of the plurality of types of equipment based on the prediction model of the monitoring target value, it is possible to calculate appropriate adjustment amounts of the operation amounts such that the monitoring target value becomes a desired value.

Because the constraint condition based on the measurement value and the constraint condition based on the operation condition of the plant when the measurement value is measured are applied, in the present aspect, it is possible to perform control which does not contradict the existing control. Further, because various kinds of conditions can be applied, in the present aspect, it is possible to employ a constraint condition based on the operation state of the plant.

Therefore, according to the present aspect, it is possible to adjust the appropriate adjustment amounts of the operation amounts based on the prediction model within a range of the existing control by applying the constraint condition.

In the above-described aspect, the prediction model deriving unit may derive the prediction model through multiple regression analysis using a linear prediction expression including partial regression coefficients and explanatory variables, the adjustment amount calculating unit may calculate the first adjustment amounts of a plurality of the operation amounts based on the partial regression coefficients of the linear prediction expression of the prediction model, and the constraint condition setting unit may set the constraint condition such that a sum of the first adjustment amounts of the operation amounts is fixed.

According to the present aspect, because the prediction model is derived using the linear prediction expression including the partial regression coefficients, the first adjustment amounts of the plurality of operation amounts are calculated based on the partial regression coefficients, and the adjusted operation amounts are calculated by applying the constraint condition that a sum of the first adjustment amounts of the operation amounts is fixed, appropriate adjustment amounts of the operation amounts such that the monitoring target value becomes a desired value, are calculated. Further, in the present aspect, because the sum of the first adjustment amounts of the operation amounts is fixed, a total amount of the adjustment amounts of the operation amounts is not changed, so that it is possible to perform control which does not contradict the existing control.

In the above-described aspect, the prediction model deriving unit may derive the prediction model by selecting one of the explanatory variables having higher correlation than correlation between other explanatory variables and deleting the other of the explanatory variables.

In the case where there exist explanatory variables having higher correlation between the explanatory variables, and there is multicollinearity, different values are calculated every time the partial regression coefficients are obtained, and the partial regression coefficients become unstable. In this case, in the present aspect, there is a possibility that a correct prediction model cannot be constructed.

Therefore, in the present aspect, the prediction model is derived by deleting one of the explanatory variables having high correlation. By this means, it is possible to construct the prediction model while resolving multicollinearity.

In the above-described aspect, the prediction model deriving unit may calculate distribution of the partial regression coefficients in a predetermined interval, may calculate a credible interval of the prediction model from distribution of the prediction model based on the distribution of the partial regression coefficients, in the case where a width of the credible interval is equal to or less than a predetermined threshold, the adjustment amount calculating unit may calculate the first adjustment amounts using the prediction model, and, in the case where the width of the credible interval exceeds the predetermined threshold, the prediction model deriving unit may derive a new prediction model in the next predetermined interval.

The credible interval of the prediction model is calculated, and, in the case where the width of the credible interval is equal to or less than the predetermined threshold, the adjustment amount calculating unit calculates the first adjustment amounts using the prediction model. Further, in the case where the width of the credible interval exceeds the predetermined threshold, the prediction model is discarded, and the prediction model deriving unit constructs a new prediction model in the next predetermined interval again at that time point. The credible interval of the prediction model indicates variation in the predicted values, and, when the width of the credible interval is small, it can be said that the reliability of the prediction model is high.

In the present aspect, because only the prediction model in which the width of the credible interval is equal to or less than the threshold is used, it is possible to use the prediction model with high reliability. Further, even in the case where characteristics of the prediction model change, because it is possible to understand that the predicted values change by the width of the credible interval exceeding the predetermined threshold, it is possible to perform control while updating the prediction model in the present aspect.

In the above-described aspect, the operation amount calculating unit may calculate a plurality of the adjusted operation amounts based on a plurality of the second adjustment amounts and the operation amounts of the existing control and may input a test signal to the operation amounts of the existing control.

According to the present aspect, because the test signal is input to the operation amounts of the existing control, the adjusted operation amounts including the test signal are input to the plant, and the result is applied to the prediction model as the measurement value. By making the test signal a value greater than a normal operation amount, it is possible to provide large fluctuation to the plant, so that it is possible to obtain the partial regression coefficients of the linear prediction expression more accurately. According to the present aspect, it is possible to improve the reliability of the prediction model.

In the above-described aspect, the operation amount calculating unit may set the test signal so as to be a value within a predetermined range in which the test signal does not become a disturbance to the existing control.

According to the present aspect, the test signal is set at a value within a predetermined range so that the test signal does not become a disturbance to the existing control. It is possible to avoid the test signal from becoming an unnecessary disturbance during operation of the plant and update the prediction model while the plant performs operation.

The plant according to one aspect in some embodiments of the present disclosure includes one of the above-described control devices.

A control method of a plant according to one aspect in some embodiments of the present disclosure is a control method of a plant which controls operation amounts of a plurality of types of equipment constituting the plant, the control method including a step of deriving a prediction model to which a measurement value measured at the plant is input, and from which a monitoring target value which is a value to be monitored is output, a step of calculating the operation amounts of a plurality of types of the equipment in the case where the monitoring target value which is to be output becomes a desired value, and calculating differences between the operation amounts of existing control and the calculated operation amounts as first adjustment amounts, a step of setting a constraint condition of the operation amounts of a plurality of types of the equipment based on the measurement value and an operation condition of the plant when the measurement value is measured, and a step of calculating second adjustment amounts obtained by correcting the first adjustment amounts by applying the set constraint condition, for each of a plurality of types of the equipment, and calculating a plurality of the adjusted operation amounts based on each of the calculated second adjustment amounts.

A computer-readable storage medium storing a control program of a plant according to one aspect in some embodiments of the present disclosure is a computer-readable storage medium storing a control program of a plant which controls operation amounts of a plurality of types of equipment constituting the plant, the control program of the plant including a step of deriving a prediction model to which a measurement value measured at the plant is input, and from which a monitoring target value which is a value to be monitored is output, a step of calculating the operation amounts of a plurality of types of the equipment in the case where the monitoring target value which is to be output becomes a desired value, and calculating differences between the operation amounts of existing control and the calculated operation amounts as first adjustment amounts, a step of setting a constraint condition of the operation amounts of a plurality of types of the equipment based on the measurement value and an operation condition of the plant when the measurement value is measured, and a step of calculating second adjustment amounts obtained by correcting the first adjustment amounts by applying the set constraint condition, for each of a plurality of types of the equipment, and calculating a plurality of the adjusted operation amounts based on each of the calculated second adjustment amounts.

According to the present disclosure, because the adjustment amounts of the operation amounts of a plurality of types of the equipment are calculated, it is possible to calculate appropriate adjustment amounts of the operation amounts such that the monitoring target value becomes a desired value and perform control in accordance with the adjustment amounts.

Further, according to the present disclosure, because a constraint condition based on the operation state of the plant is set, it is possible to control adjustment of the operation amounts within a range of the existing control.

DETAILED DESCRIPTION OF THE INVENTION

Each embodiment of a control device of a plant, a plant, a control method of a plant and a computer-readable storage medium storing a control program of a plant according to some embodiments of the present disclosure will be described below with reference to the drawings.

Figure 1:
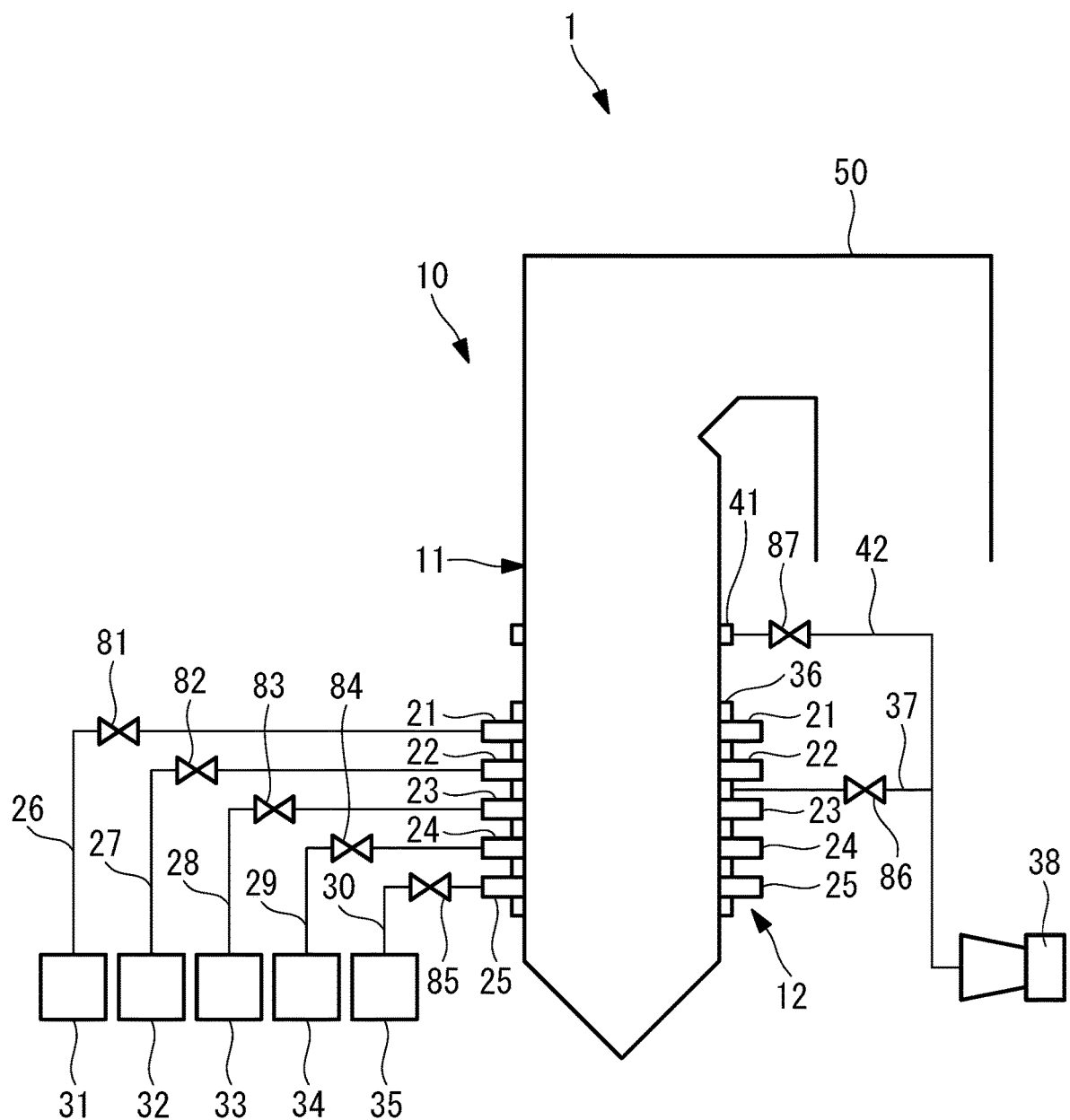
FIG. 1 is a schematic configuration diagram illustrating one aspect of a plant according to some embodiments.

FIG. 1 illustrates a schematic configuration of one aspect of the plant according to some embodiments of the present disclosure.

It is assumed that a boiler 10 of the plant 1 illustrated in FIG. 1 is a pulverized coal-fired boiler which uses pulverized coal obtained by pulverizing coal (such as bituminous coal and subbituminous coal) as a pulverized fuel (solid fuel), and which can make this pulverized coal combust by a combustion burner and can collect heat generated by this combustion.

As illustrated in FIG. 1, the boiler 10 of the plant 1 includes a furnace 11 and a combustion device 12. The furnace 11 is provided along a vertical direction in a hollow shape, and a furnace wall constituting this furnace 11 is configured with a heat transfer pipe.

The combustion device 12 is provided at a lower part of the furnace wall (heat transfer pipe) constituting this furnace 11. This combustion device 12 includes a plurality of combustion burners 21, 22, 23, 24 and 25 mounted on the furnace wall. In the present embodiment, five sets, that is, five stages of the combustion burners 21, 22, 23, 24 and 25, each including four combustion burners disposed along a circumferential direction at equal intervals, are disposed along the vertical direction. A shape of the furnace 11, the number of combustion burners in one stage and the number of stages are not limited to those in this embodiment.

The respective combustion burners 21, 22, 23, 24 and 25 are connected to coal pulverizers (mills) 31, 32, 33, 34 and 35 via regulating valves 81, 82, 83, 84 and 85 and pulverized coal supply pipes 26, 27, 28, 29 and 30. While not illustrated, the coal pulverizers 31, 32, 33, 34 and 35 are configured such that a pulverizing table is supported so as to be able to be driven and rotated centering around a rotating shaft along the vertical direction inside a housing, and a plurality of pulverizing rollers are supported above this pulverizing table so as to face the pulverizing table and so as to be able to rotate in conjunction with rotation of the pulverizing table. If coal is poured between the plurality of pulverizing rollers and the pulverizing table, the coal is pulverized to a predetermined size, amounts of the pulverized coal classified by air for conveyance (primary air) are adjusted by the regulating valves 81, 82, 83, 84 and 85, and can be supplied to the combustion burners 21, 22, 23, 24 and 25 from the pulverized coal supply pipes 26, 27, 28, 29 and 30.

A wind box 36 is provided at positions where each of the combustion burners 21, 22, 23, 24 and 25 is mounted in the furnace 11. One end portion of an air duct 37 is connected to the wind box 36. A blower 38 is mounted at the other end portion of the air duct 37. Air for combustion (secondary air) sent by the blower 38 can be supplied from the air duct 37 to the wind box 36, and can be supplied to the respective combustion burners 21, 22, 23, 24 and 25 from this wind box 36. An amount of the air for combustion to be supplied to the wind box 36 is adjusted by a regulating valve 86 provided at the air duct 37.

An air injection device 41 is provided above positions where the respective combustion burners 21, 22, 23, 24 and 25 are mounted in the furnace 11. An end portion of a branched air duct 42 branched from the air duct 37 is connected to the air injection device 41. The air for combustion (secondary air) sent from the blower 38 can be supplied to the air injection device 41 from the branched air duct 42. While not illustrated, the air injection device 41 is configured with four air nozzles provided along a circumferential direction of the furnace 11 at equal intervals. An amount of the air for combustion to be supplied to the air injection device 41 is adjusted by a regulating valve 87 provided at the branched air duct 42.

The combustion burners 21, 22, 23, 24 and 25 can form flame swirl flow by injecting pulverized fuel-air mixture (fuel gas) which is mixture of the pulverized coal and the air for conveyance toward inside the furnace 11. The air injection device 41 can inject the air for combustion toward above the flame swirl flow inside the furnace 11 as additional air.

As illustrated in FIG. 1, a gas duct 50 is connected to an upper part of the furnace 11. In this gas duct 50, a superheater (not illustrated) for collecting heat of an exhaust gas as a convection heat transfer unit, a reheater (not illustrated), and an economizer (not illustrated) are provided, and heat is exchanged between an exhaust gas generated by combustion at the furnace 11 and water.

If the coal pulverizers 31, 32, 33, 34 and 35 are driven at the coal-fired boiler configured in this manner, the generated pulverized coal is supplied to the combustion burners 21, 22, 23, 24 and 25 through the pulverized coal supply pipes 26, 27, 28, 29 and 30 and the regulating valves 81, 82, 83, 84 and 85 along with the air for conveyance. The air for combustion is supplied to the respective combustion burners 21, 22, 23, 24 and 25 from the air duct 37 via the wind box 36. The air for combustion is supplied to the air injection device 41 from the branched air duct 42.

The plant 1 includes a control device 70.

The control device 70 controls the operation amounts based on the measurement value (such as, for example, a pressure and a temperature) measured at the plant 1, the operation conditions of the plant 1 when the measurement value is measured, or the like. In the case where the operation amounts are amounts of pulverized coal, the control device 70 controls opening degrees of the regulating valves 81, 82, 83, 84 and 85 in accordance with the amounts of pulverized coal. Further, in the case where the operation amounts are amounts of air (amounts of air for combustion), the control device 70 controls opening degrees of the regulating valves 86 and 87.

Further, the control device 70 includes a prediction model deriving unit 71, an adjustment amount calculating unit 72, a constraint condition setting unit 73, and an operation amount calculating unit 74.

The control device 70 is configured with, for example, a CPU (Central Processing Unit), a RAM (Random Access Memory), a ROM (Read Only Memory), a computer-readable non-transitory storage medium, or the like. Then, a series of processing for implementing various kinds of functions is stored in the storage medium, or the like, in a form of a program as an example, and by the CPU reading out this program to the RAM, or the like, and executing information processing and operation processing, the various kinds of functions are implemented. Note that it is also possible to apply a form in which the program is installed in advance in the ROM or other storage media, a form in which the program is provided in a state where the program is stored in a computer-readable storage medium, a form in which the program is distributed via a wired or wireless communication means, or the like. The computer-readable storage medium is a magnetic disk, a magnetooptical disk, a CD-ROM, a DVD-ROM, a semiconductor memory, or the like.

The amounts of pulverized coal and the amounts of air for combustion to be supplied to the respective combustion burners 21, 22, 23, 24 and 25, and the amount of air for combustion to be supplied to the air injection device 41 are typically respectively equally distributed. However, the inventors have gained an insight that it is possible to change an amount of substance such as, for example, $NO_x$, which is environmentally regulated, by changing distribution of the amounts of pulverized coal and distribution of the amounts of air for combustion.

Therefore, in the present disclosure, for example, distribution of the amounts of pulverized coal to be supplied to the respective combustion burners 21, 22, 23, 24 and 25 is changed.

Figure 2:
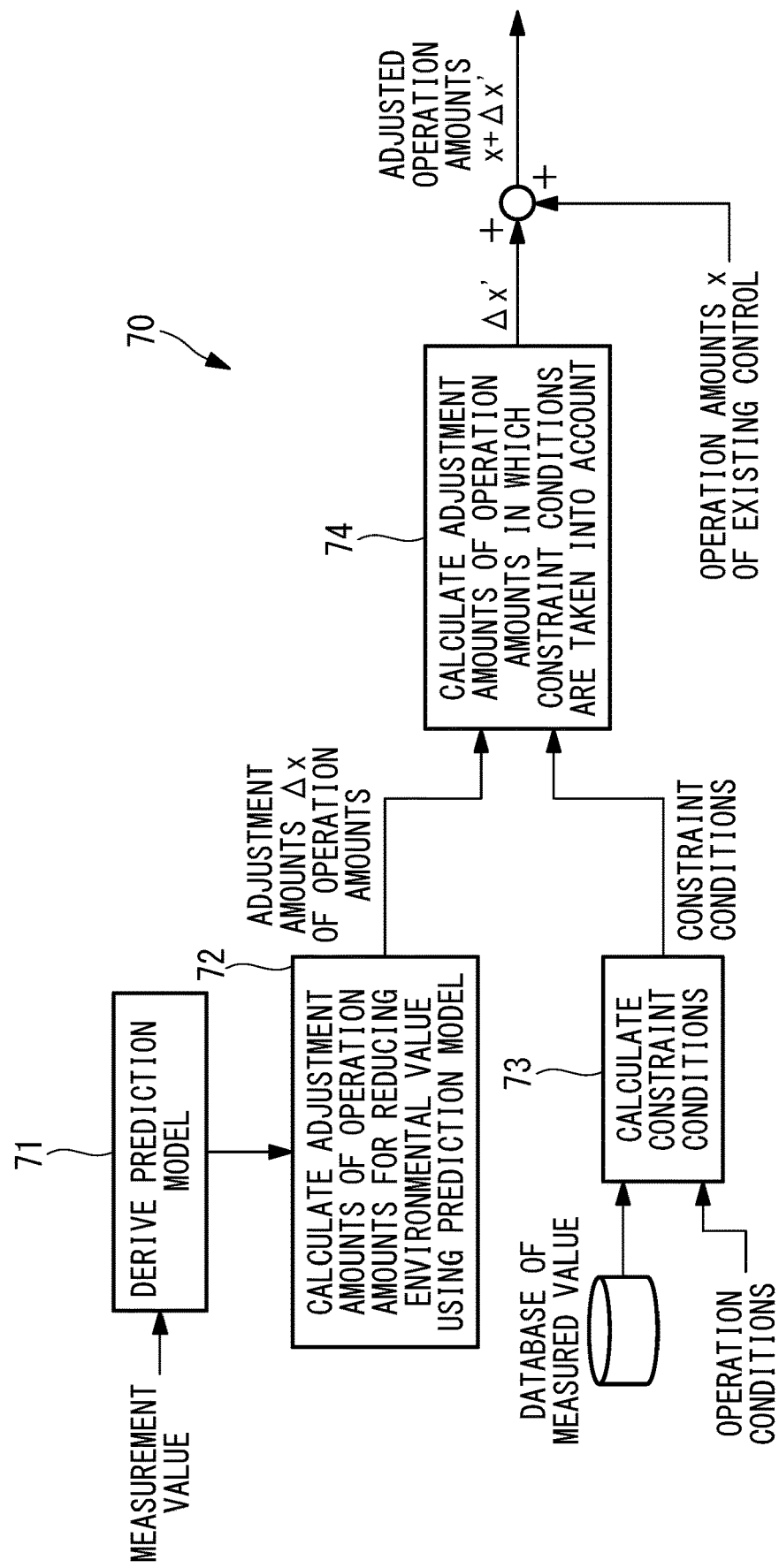
FIG. 2 is a block diagram illustrating one aspect of a control device of the plant according to some embodiments.

FIG. 2 illustrates a block diagram of one aspect of the control device of the plant according to some embodiments.

The control device 70 of the plant 1 of the present disclosure calculates adjustment amounts of the respective amounts of pulverized coal to be supplied to the respective combustion burners 21, 22, 23, 24 and 25, which are operation amounts, using a prediction model of $NO_x$ based on the measurement value at the plant 1 and constraint conditions based on the measurement value (an operation measured value and a measured value) and operation conditions of the plant 1 when the measurement value is measured, to reduce a discharge amount of $NO_x$ (monitoring target value) to be discharged from the plant 1.

Here, the measurement value (operation measured value) is a general process value which becomes explanatory variables of the prediction model. That is, the operation measured value is a measurement value measured at the plant 1, and is a value which becomes input of the prediction model. The operation measured value is stored in a database in chronological order. The operation measured value may be stored in association with the constraint conditions upon measurement.

The control device 70 of the plant 1 specifically performs the following control.

The prediction model deriving unit 71 of the control device 70 derives the prediction model of $NO_x$ to which the measurement value (such as, for example, a pressure and a temperature of the boiler 10) measured at the plant 1 is input, and from which $NO_x$ which is the monitoring target value is output.

The adjustment amount calculating unit 72 of the control device 70 calculates the first adjustment amounts Δx of the amounts of pulverized coal such that a value of $NO_x$ output by the prediction model of $NO_x$ derived by the prediction model deriving unit 71 becomes a desired value, that is, a discharge amount of $NO_x$ is reduced. Specifically, the adjustment amount calculating unit 72 calculates operation amounts of a plurality of types of equipment in the case where the value of $NO_x$ output from the prediction model becomes the smallest and sets differences from operation amounts in the case where existing control is performed as the first adjustment amounts Δx.

Further, the control device 70 makes a database of the measurement value acquired upon operation of the plant 1, and sets this database as a database of the measurement value (the operation measured value, the measured value). Operation conditions of the plant 1 when the measurement value is measured by an operation manager of the plant 1 are set at the control device 70. The operation conditions of the plant 1 may be set by the control device 70 by using a learning function.

The constraint condition setting unit 73 of the control device 70 calculates constraint conditions based on the database of the measurement value (operation measured value) and the operation conditions of the plant 1 when the measurement value is measured.

Examples of the constraint conditions obtained from the database of the measurement value (operation measured value) can include "An upper limit of an operation amount C is α", "Because there is correlation between an operation amount D and an operation amount E at a predetermined operational point, control is performed so that a ratio between the operation amount D and the operation amount E becomes constant", or the like.

Further, examples of the constraint conditions obtained from the operation conditions of the plant 1 can include "A total amount of pulverized coal is maintained fixed to maintain constant power generation output", "a sum of amounts of air for combustion is maintained within a fixed range for stable combustion", or the like.

The operation amount calculating unit 74 of the control device 70 applies the constraint conditions to the first adjustment amounts Δx of the respective amounts of pulverized coal which are operation amounts using the prediction model, to calculate second adjustment amounts Δx' of the respective amounts of pulverized coal which do not contradict existing control which is existing control of the plant 1.

Further, the operation amount calculating unit 74 adds or subtracts the calculated second adjustment amounts Δx' of the respective amounts of pulverized coal to or from the operation amounts x of the existing control to calculate the adjusted respective operation amounts x±Δx'.

The control device 70 controls the opening degrees of the regulating valves 81, 82, 83, 84 and 85 based on the adjusted respective operation amounts x±Δx' calculated by the operation amount calculating unit 74.

As described above, according to the control device of the plant, the plant, the control method of the plant and the computer-readable storage medium storing the control program of the plant according to the present embodiment, the following operational effects are provided.

According to the present embodiment, by calculating the adjustment amounts of the operation amounts of the plurality of types of equipment based on the prediction model of the monitoring target value $NO_x$, it is possible to calculate appropriate adjustment amounts of the operation amounts such that the monitoring target value $NO_x$ becomes a desired value.

Because the constraint conditions based on the measurement value and the constraint conditions based on the operation conditions of the plant 1 when the measurement value is measured are applied, according to the present embodiment, it is possible to perform control which does not contradict the existing control. Further, because various conditions can be applied, according to the present embodiment, it is possible to apply constraint conditions based on the operation state of the plant 1.

Therefore, according to the present embodiment, it is possible to adjust the appropriate adjustment amounts of the operation amounts based on the prediction model within a range of the existing control by applying the constraint conditions.

Specific examples for the above will be further described below.

The prediction model deriving unit 71 of the control device 70 derives the prediction model of $NO_x$ using the following prediction expression which is a linear prediction expression including partial regression coefficients and explanatory variables, through multiple regression analysis.

[Expression 1]

$$z = \beta_0 + \beta_1 x_1 + \ldots + \beta_4 x_4 + \beta_5 x_5 + \ldots + \beta_n x_n \quad (1)$$

In expression (1), z indicates a predicted value of $NO_x$ in a state where adjustment is not performed, that is, in the case where amounts of pulverized coal are equally distributed to the respective combustion burners 21, 22, 23, 24 and 25, $\beta_n$ indicates partial regression coefficients, and $x_n$ indicates explanatory variables. Further, $x_1$, $x_2$, $x_3$, $x_4$ and $x_5$ indicate adjustable operation amounts among the respective operation amounts of the plurality of types of equipment of the plant 1, and, in the present embodiment, indicate the respective amounts of pulverized coal of the respective combustion burners 21, 22, 23, 24 and 25.

The predicted value of $NO_x$ in the case where control is performed using the adjustment amounts of the respective amounts of pulverized coal by the control device 70 is set as $z_{aft}$, and, if the constraint conditions set by the constraint condition setting unit 73 are set such that the sum of the respective amounts of pulverized coal of the respective combustion burners 21, 22, 23, 24 and 25 is fixed, $z_{aft}$ is expressed with the following expression (2).

[Expression 2]

$$z_{aft} = z + \sum_{i=1}^{4} (\beta_i - \beta_5) \Delta x_i \quad (2)$$

To make the predicted value $z_{aft}$ of $NO_x$ a minimum value using expression (2), $\Delta x = [\Delta_{x1} \Delta_{x2} \ldots \Delta_{x5}]^T$ which makes a value expressed with expression (3) a minimum is calculated.

[Expression 3]

$$\sum_{i=1}^{4} (\beta_i - \beta_5) \Delta x_i \quad (3)$$

Because $\beta_n$ is known, a difference (vector) Δβ of the partial regression coefficients $\beta_n$ is also known as expressed with expression (4).

[Expression 4]

$$\Delta \beta = \begin{bmatrix} \beta_1 - \beta_4 \\ \beta_2 - \beta_4 \\ \beta_3 - \beta_4 \end{bmatrix} \quad (4)$$

Therefore, by calculating $\Delta x_1$, $\Delta x_2$, $\Delta x_3$ and $\Delta x_4$ which are reverse to the difference vector Δβ expressed with expression (4), the predicted value $z_{aft}$ of $NO_x$ becomes a minimum. $\Delta x_1$, $\Delta x_2$, $\Delta x_3$, $\Delta x_4$ and $\Delta x_5$ in the case where the predicted value of $NO_x$ becomes a minimum can be expressed with the following expression (5) and expression (6).

[Expression 5]

$$\begin{bmatrix} \Delta x_1 \\ \Delta x_2 \\ \Delta x_3 \\ \Delta x_4 \end{bmatrix} = -k \frac{\Delta \beta}{|\Delta \beta|} \quad (5)$$

[Expression 6]

$$\Delta x_5 = -\Delta x_1 - \Delta x_2 - \Delta x_3 - \Delta x_4 \quad (6)$$

In expression (5), k is an adjustment parameter. As expressed in expression (5), the adjustment amounts of the respective operation amounts (here, amounts of pulverized coal) are calculated in accordance with values of the partial regression coefficients $\beta_n$ in the prediction model using multiple regression analysis of the monitoring target value $NO_x$. Because a right side in expression (5) is negative, in the case where an absolute value of the partial regression coefficients $\beta_n$ is greater in a positive direction, the adjusted operation amounts decrease because the adjustment amounts $\Delta x_n$ are subtracted from the operation amounts $x_n$. In the case where the absolute value of the partial regression coefficients $\beta_n$ is greater in a negative direction, the adjusted operation amounts increase because the adjustment amounts $\Delta x_n$ are added to the operation amounts $x_n$. In the case where the absolute value of the partial regression coefficients $\beta_n$ is small, fluctuation of the adjusted operation amounts is small because the adjustment amounts $\Delta x_n$ also become small values.

The opening degrees of the respective regulating valves 81, 82, 83, 84 and 85 are controlled by the control device 70 so as to correspond to the adjusted respective operation amounts of the respective combustion burners 21, 22, 23, 24 and 25 calculated in this manner.

Here, there is a case where there is correlation between the respective operation amounts. If explanatory variables having higher correlation than correlation between other explanatory variables are included in the prediction model, the partial regression coefficients corresponding to the explanatory variables become unstable. This is because, while, in the case where there is no correlation, the partial regression coefficients can be uniquely determined, in the case where there is high correlation, there is multicollinearity, different partial regression coefficients are calculated every time the partial regression coefficients are obtained. In the case where values of the partial regression coefficients cannot be stably obtained as a result of the partial regression coefficients being different each time, the adjustment amounts of the respective operation amounts cannot be stably obtained, and appropriate adjustment amounts cannot be calculated.

In the present disclosure, in the case where explanatory variables having higher correlation than correlation between other explanatory variables are included, it is also possible to derive the prediction model by selecting and remaining one of the explanatory variables and deleting the other explanatory variable. In the case where there exist three or more explanatory variables having high correlation, it is also possible to select and remain one explanatory variable and delete the other explanatory variables.

Examples of a method for deleting the explanatory variables can include a method using a LASSO (Least Absolute Shrinkage and Selection Operator), a method in which operation data is analyzed and explanatory variables having correlation coefficients equal to or greater than a fixed value (for example, having correlation coefficients equal to or greater than 0.6) are deleted, or the like. Any method may be used if it is possible to stably obtain values of the partial regression coefficients.

According to the present embodiment, because the prediction model is derived using the linear prediction expression including the partial regression coefficients, the first adjustment amounts of the plurality of operation amounts are calculated based on the partial regression coefficients, and the adjusted operation amounts are calculated by applying constraint conditions that a sum of the first adjustment amounts of the operation amounts is fixed, appropriate adjustment amounts of the operation amounts such that the monitoring target value $NO_x$ becomes a desired value are calculated. Further, the sum of the first adjustment amounts of the operation amounts is made fixed, according to the present embodiment, a total amount of the adjustment amounts of the operation amounts is not changed, so that it is possible to perform control which does not contradict the existing control.

In the case where explanatory variables having high correlation between the explanatory variables exist, and there is multicollinearity, different partial regression coefficients are calculated every time the partial regression coefficients are calculated, and thus, the partial regression coefficients become unstable. In this case, there is a possibility that a correct prediction model cannot be constructed in the present embodiment.

Therefore, in the present embodiment, the prediction model is derived by deleting one of the explanatory variables having high correlation.

According to the present embodiment, it is possible to construct the prediction model while resolving multicollinearity.

Subsequently, use of reliability of the predicted values by calculating variation in the predicted values for the predicted values obtained in the prediction model will be considered.

Figure 3:
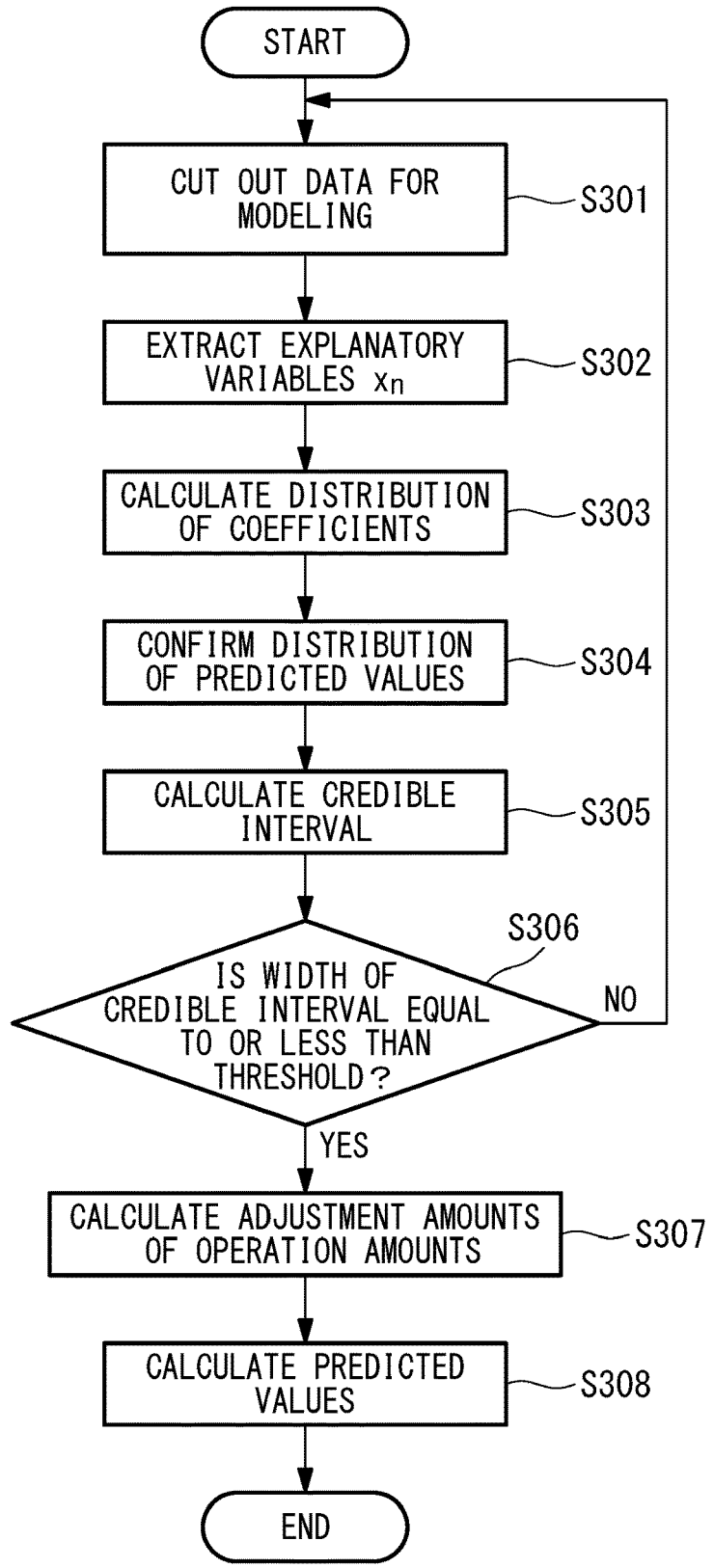
FIG. 3 is a flowchart illustrating one aspect of processing of the control device of the plant according to some embodiments.

FIG. 3 illustrates a flowchart of one aspect of processing of the control device of the plant according to some embodiments. Control of minimizing the value of $NO_x$ which is the monitoring target value will be considered using the present flowchart.

In S301 in FIG. 3, data for modeling which is necessary for constructing the prediction model is cut out. Step S301 will be described using FIG. 4.

Figure 4:
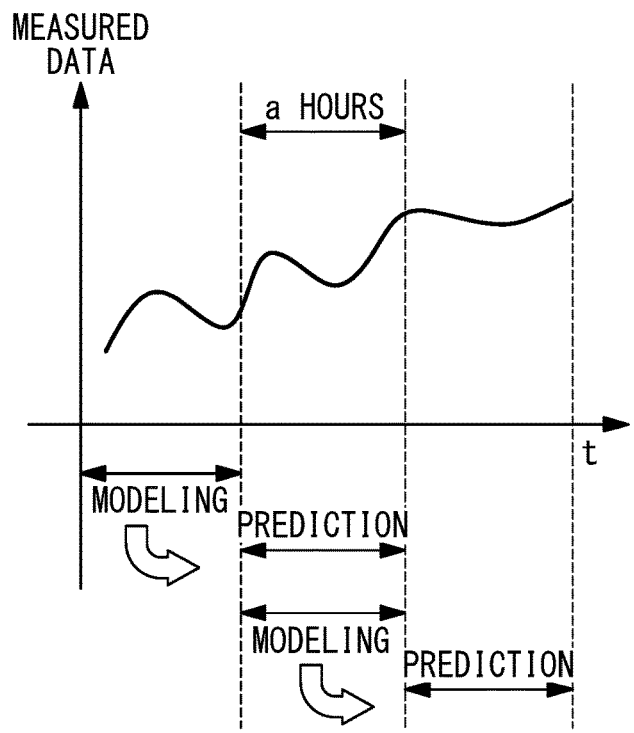
FIG. 4 is a graph of a time chart illustrating an example of transition of measured data of the plant.

FIG. 4 illustrates a graph of a time chart illustrating an example of transition of measured data of $NO_x$ of the plant. FIG. 4 indicates a value of the measured data of $NO_x$ on a vertical axis and indicates time on a horizontal axis.

In the case where the measured data of $NO_x$ of the plant 1 transitions as illustrated in FIG. 4, the control device 70 calculates the predicted values of $NO_x$ in an interval of a hours from the present to a hours after based on the prediction model constructed using the previous data set.

Subsequently, in S302 in FIG. 3, explanatory variables $x_1$, ... $x_n$ are extracted. Step S302 will be described using FIG. 5.

Figure 5:
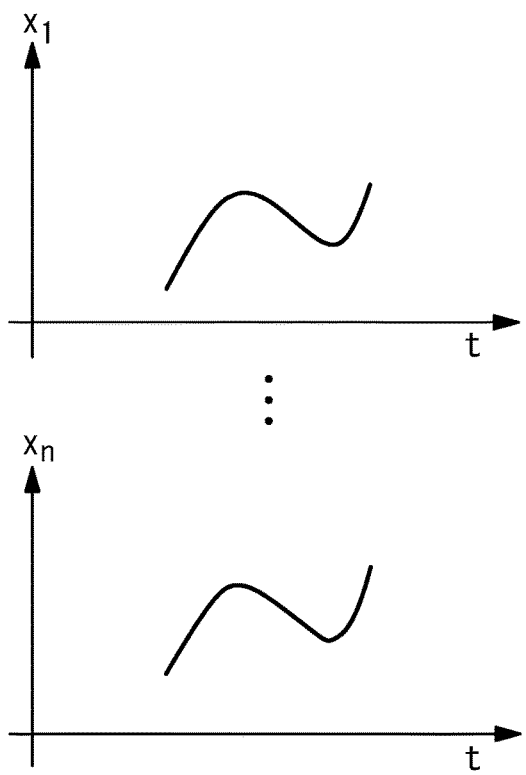
FIG. 5 is a graph of a time chart illustrating an example of transition of explanatory coefficients.

FIG. 5 illustrates a graph of a time chart illustrating an example of transition of the explanatory variables. FIG. 5 indicates a value of each explanatory variable on each vertical axis and indicates time on each horizontal axis.

As illustrated in FIG. 5, the respective explanatory variables corresponding to the predicted values of $NO_x$ in the interval of a hours of the data for modeling cut out in step S301 are taken out by the control device 70.

Then, in S303 in FIG. 3, distribution of the partial regression coefficients is calculated. Step S303 will be described using FIG. 6.

Figure 6:
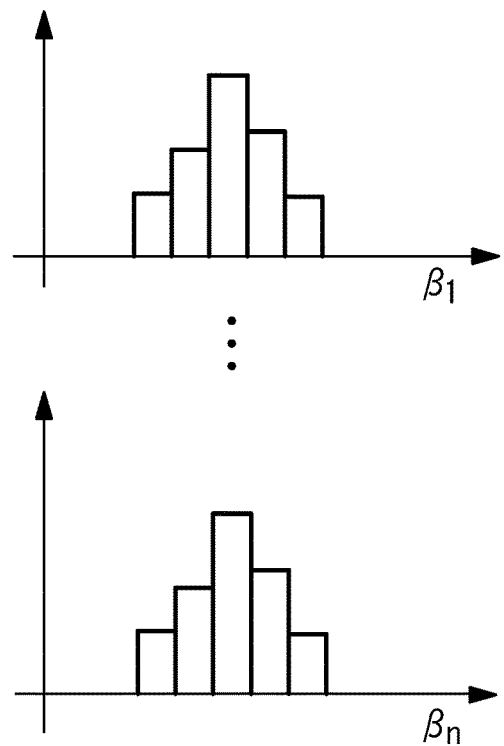
FIG. 6 is a graph illustrating distribution of partial regression coefficients.

FIG. 6 illustrates a graph of the distribution of the partial regression coefficients. FIG. 6 indicates frequency of the partial regression coefficients on each vertical axis, and indicates a value of each partial regression coefficient on each horizontal axis.

As illustrated in FIG. 6, the distribution of the respective partial regression coefficients has a shape of normal distribution or close to normal distribution. While there are various methods as a method for calculating the distribution of the partial regression coefficients, examples of the method can include, for example, a bootstrap method, MCMC (Markov Chain Monte Carlo methods), or the like. In the present disclosure, the distribution of the partial regression coefficients is calculated using a GLM (Generalized Linear Model) and the bootstrap method of n times.

Then, in step S304 in FIG. 3, distribution of the predicted values is confirmed. Step S304 will be described using FIG. 7.

Figure 7:
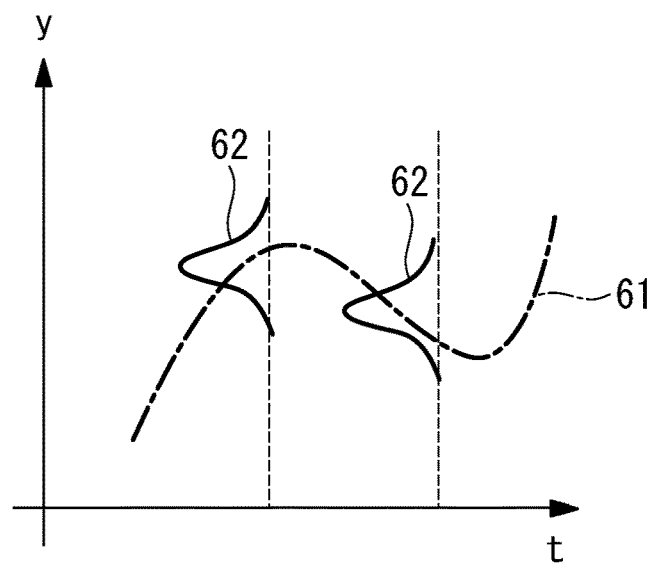
FIG. 7 is a graph illustrating distribution of predicted values of a monitoring target value.

FIG. 7 illustrates a graph of the distribution of the predicted values of $NO_x$. FIG. 7 indicates predicted values of $NO_x$ on a vertical axis, indicates time on a horizontal axis, indicates the predicted values of $NO_x$ with a dot-and-dash line 61, indicates distribution of the predicted values at each time with a solid line 62, and indicates time at which the distribution of the predicted values of the solid line 62 is calculated with a dotted line.

As illustrated in FIG. 7, the distribution of the predicted values at respective times is calculated using the respective explanatory variables $x_1, \ldots x_n$ at the respective times as input values with respect to the prediction model. The distribution of the predicted values is based on the distribution of the partial regression coefficients. A line obtained by plotting a mode value of the distribution of the predicted values at the respective times is the dot-and-dash line 61, that is, the predicted values of $NO_x$.

Then, in step S305 in FIG. 3, a credible interval is calculated. Step S305 will be described using FIG. 8.

Figure 8:
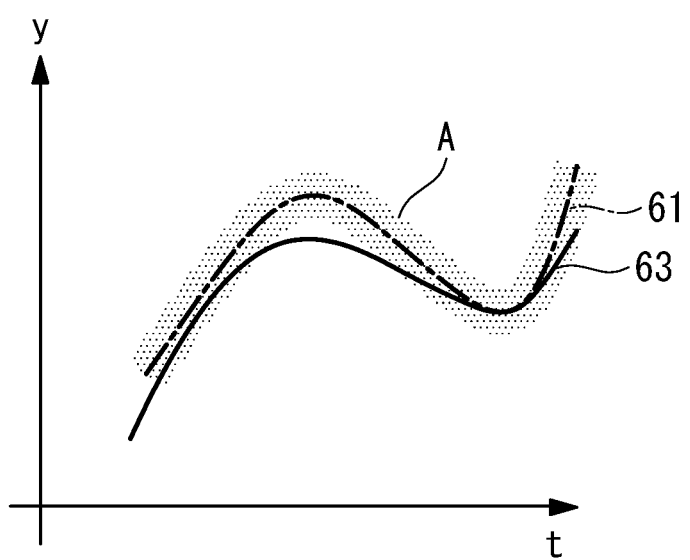
FIG. 8 is a graph illustrating a credible interval for the distribution of the predicted values of the monitoring target value.

FIG. 8 illustrates a graph of the credible interval with respect to the distribution of the predicted values of $NO_x$. FIG. 8 indicates a value of $NO_x$ on a vertical axis, indicates time on a horizontal axis, indicates measured values of $NO_x$ with a solid line 63, indicates the predicted values of $NO_x$ with the dot-and-dash line 61, and indicates a 90% credible interval of the predicted values of $NO_x$ with a shaded area A.

The distribution of the predicted values calculated in step S304 is illustrated in the shaded area A in FIG. 8 as the credible interval. The credible interval of the present disclosure is a 90% credible interval. The 90% credible interval indicates a range except upper 5% and lower 5% from a range of distribution of the values. It can be said that a width of the credible interval is a value indicating a range of variation in the predicted values.

Then, in step S306 in FIG. 3, it is determined whether or not the width of the credible interval is equal to or less than a threshold. In the case where it is determined that the width of the credible interval is equal to or less than the threshold, the processing shifts to step S307. On the other hand, in the case where it is determined that the width of the credible interval exceeds the threshold, the processing returns to step S301.

A case where the width of the credible interval is equal to or less than the threshold indicates that variation in the predicted values falls within a predetermined range. At this time, because the prediction model is an appropriate prediction model which has high reliability, the adjustment amounts of the operation amounts are calculated using this prediction model.

Meanwhile, a case where the width of the credible interval exceeds the threshold indicates that variation in the predicted values is large. At this time, because it cannot be said that the prediction model is an appropriate model, this prediction model is discarded, the processing returns to step S301, and a new prediction model is constructed using a data set in the next interval.

Figure 9:
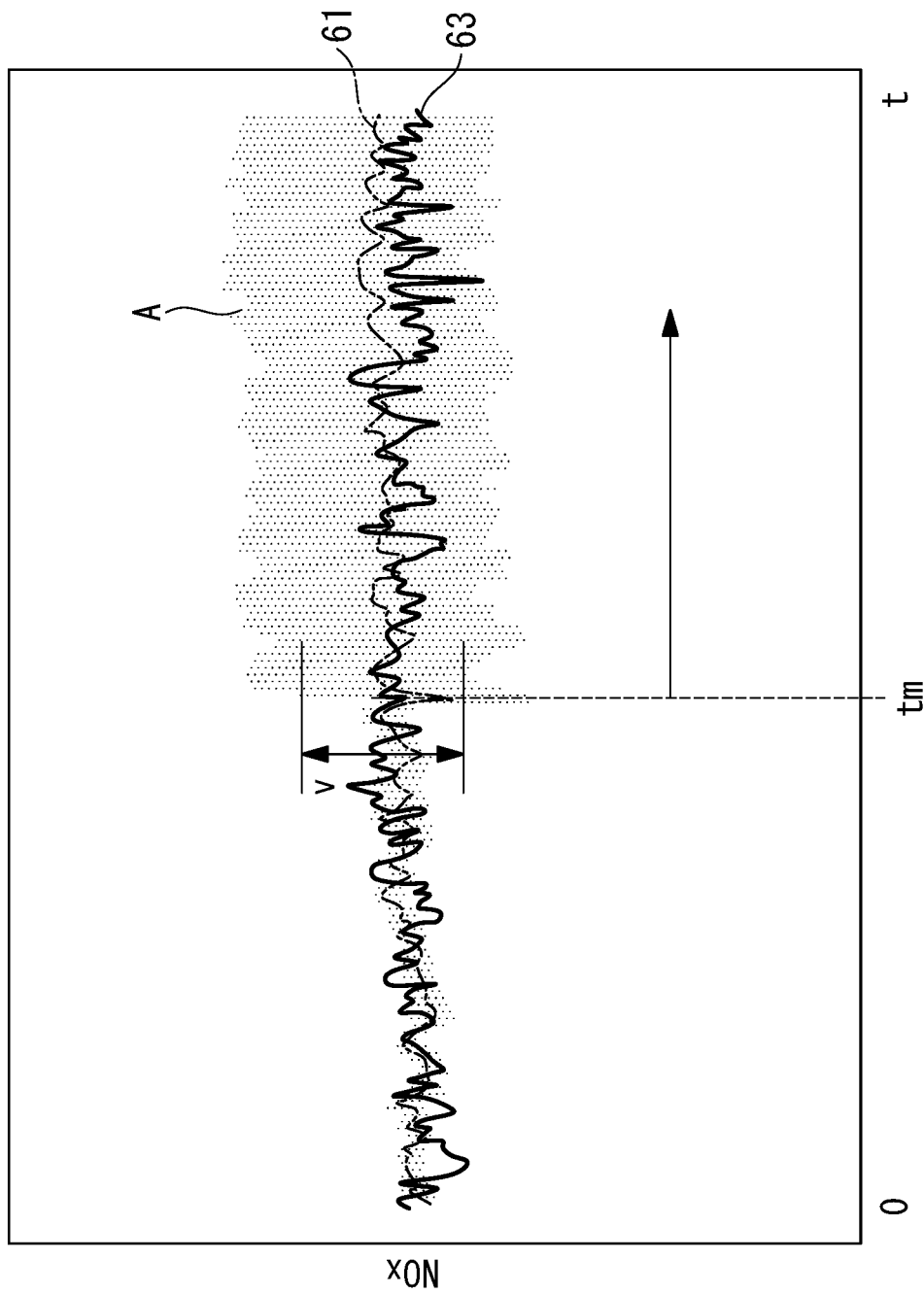
FIG. 9 is a graph illustrating distribution of the predicted values of the monitoring target value in the case where control is performed using adjustment amounts of operation amounts.

FIG. 9 illustrates a graph of the measured values and the predicted values of $NO_x$, and a credible interval with respect to distribution of the predicted values. FIG. 9 indicates values of $NO_x$ on a vertical axis, indicates time on a horizontal axis, indicates the measured values of $NO_x$ with the solid line 63, indicates the predicted values of $NO_x$ with the dot-and-dash line 61, and indicates a 90% credible interval of the predicted values of $NO_x$ with the shaded area A.

As illustrated in FIG. 9, during a period from time 0 to time $t_m$, because the width of the credible interval of the predicted values does not exceed a threshold v indicated with a bidirectional arrow, and the reliability of the prediction model is high, the adjustment amounts of the operation amounts are calculated using this prediction model.

Meanwhile, at and after time $t_m$ indicated with a unidirectional arrow, the width of the credible interval of the predicted values exceeds the threshold v. At and after time $t_m$, there is a possibility that, even if the adjustment amounts of the operation amounts are calculated using the prediction model which is used during a period from time 0 to time $t_m$, the amount of $NO_x$ cannot be reduced. Therefore, at and after time $t_m$, the prediction model used during a period from time 0 to time $t_m$ is discarded, and the prediction model is newly constructed using a data set in the next interval of the prediction model which is used during a period from time 0 to time $t_m$.

At time $t_m$ at which the width of the credible interval is largely changed, there can be a case where characteristics of the plant 1 change, or the like, as a result of, for example, control of the plant 1 being switched, or the like.

In the case where it is determined in step S306 that the width of the credible interval is equal to or less than the threshold, the adjustment amounts of the respective operation amounts are calculated (S307).

While various methods can be used as a method for calculating the adjustment amounts of the respective operation amounts, such as, for example, the calculation method by the control device 70 illustrated in FIG. 2, and the calculation method using expression (1) to expression (6), any method may be used.

Then, in step S308 in FIG. 3, the predicted values after the adjustment amounts of the operation amounts are adjusted are calculated. Step S308 will be described using FIG. 10.

Figure 10:
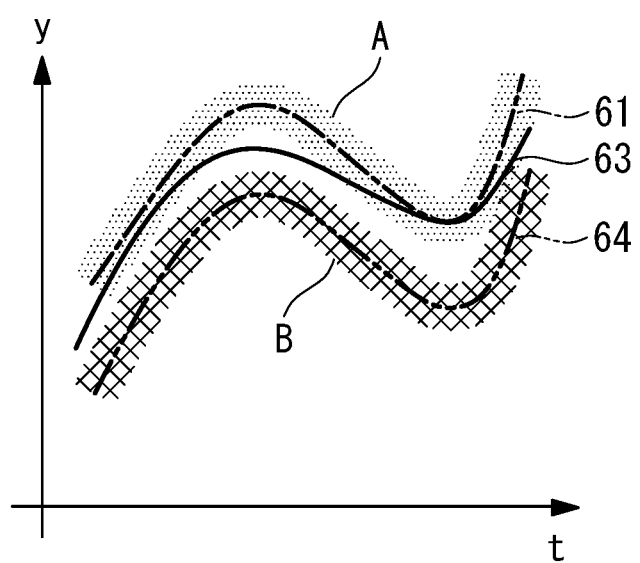
FIG. 10 is a graph illustrating a measured value of the monitoring target value, the predicted value of the monitoring target value and the credible interval.

FIG. 10 illustrates a graph of distribution of the predicted values of $NO_x$ in the case where control is performed with the adjustment amounts of the operation amounts. FIG. 10 indicates values of $NO_x$ on a vertical axis, indicates time on a horizontal axis, indicates measured values of $NO_x$ with the solid line 63, indicates the predicted values before adjustment of $NO_x$ with the dot-and-dash line 61, indicates the adjusted predicted values of $NO_x$ with a two-dot chain line 64, indicates a 90% credible interval of the predicted values before adjustment of $NO_x$ with a shaded area A, and indicates a 90% credible interval of the adjusted predicted values of $NO_x$ with a grid-like shaded area B.

It is assumed that the adjusted predicted values of $NO_x$ illustrated in FIG. 10 are predicted values subjected to control with the adjustment amounts of the respective operation amounts calculated using the calculation method using expression (1) to expression (6). As illustrated in FIG. 10, while there is a case where the predicted values (dot-and-dash line 61) before adjustment of $NO_x$ partially exceed the measured values (solid line 63) of $NO_x$, the adjusted predicted values (two-dot chain line 64) of $NO_x$ fall below the measured values all the time including the 90% credible interval (grid-like shaded area B). It can be understood that, by the control in step S307 being performed, the values of $NO_x$ decrease.

According to the present embodiment, the credible interval of the prediction model is calculated, and, in the case where a width of the credible interval is equal to or less than a predetermined threshold, the adjustment amount calculating unit 72 calculates the first adjustment amounts using the prediction model. Meanwhile, in the case where the width of the credible interval exceeds the predetermined threshold, the prediction model is discarded, and the prediction model deriving unit 71 constructs a new prediction model again in the next predetermined interval from that time point. The credible interval of the prediction model indicates a range of variation in the predicted values, and, when the width of the credible interval is small, it can be said that the reliability of the prediction model is high.

Therefore, in the present embodiment, because only the prediction model in which the width of the credible interval is equal to or less than the threshold is used, and, thus, determination is performed on the width of the credible interval using the predetermined threshold, it is possible to use the prediction model with high reliability. Further, even in the case where characteristics of the prediction model change, because it is possible to grasp change of the predicted values by the width of the credible interval exceeding the predetermined threshold, it is possible to perform control after updating the prediction model.

Further, inputting a test signal in the above-described derivation of the prediction model will be considered.

Derivation of the prediction model of the plant 1 in the present disclosure is derivation during operation upon steady operation. Therefore, because the measured value in steady operation, that is, a value with relatively small fluctuation is used, there is a case where the partial regression coefficients in the prediction model to be derived cannot be correctly calculated.

Therefore, it is assumed that a value with larger fluctuation than that in the operation amount upon steady operation is input as the test signal.

Figure 11:
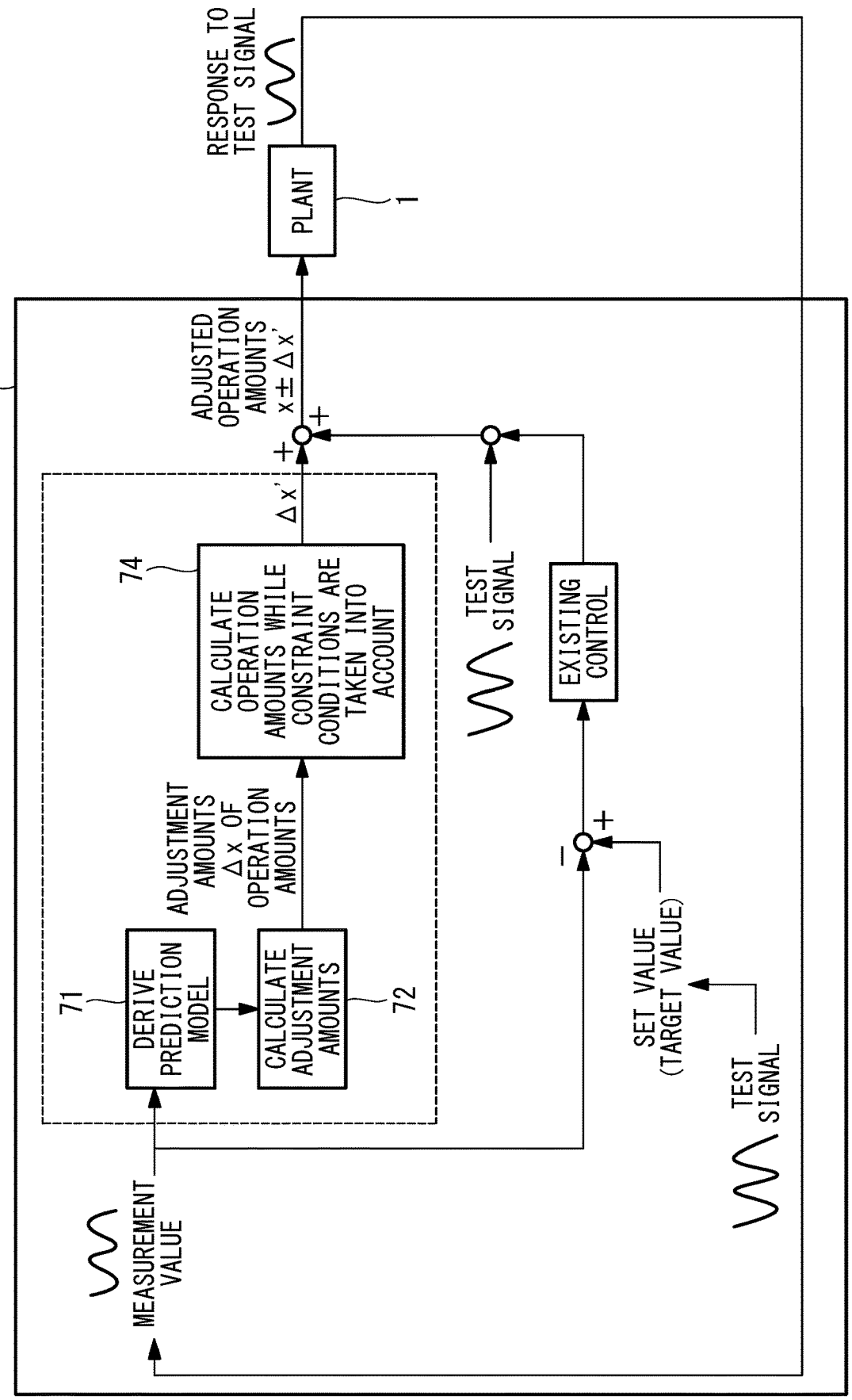
FIG. 11 is a block diagram illustrating one aspect in the case where a test signal of the control device of the plant according to some embodiments is input.

FIG. 11 illustrates a block diagram of one aspect in the case where a test signal of the control device of the plant according to some embodiments is input.

When the control device 70 of the plant 1, for example, measures a measurement value of the plant 1, the control device 70 subtracts the measurement value from a set value (target value) of the plant 1, calculates operation amounts x by controlling this through existing control, and performs PI control of measuring the measured value again by inputting these operation amounts x in the plant 1. In these series of control, the control device 70 disclosed above inputs to the plant 1, the adjusted operation amounts x±Δx' obtained by adding or subtracting the second adjustment amounts Δx' calculated using constraint conditions of the first adjustment amounts Δx calculated using the prediction model derived by the prediction model deriving unit 71 to or from the operation amounts x calculated through existing control (dashed line portion in FIG. 11).

In the present embodiment, the test signal is input for the above-described control. As illustrated in FIG. 11, the test signal may be input so that, for example, the set value (target value) of existing control is changed, for example, a target value of an amount of air is changed. Further, the test signal may be applied to the operation amounts calculated through the existing control, and, for example, an opening degree of a damper may be caused to fluctuate.

By the test signal being input and response data of the plant 1 in response to the test signal being acquired in derivation of the partial regression coefficients of the prediction model, it is possible to obtain the partial regression coefficients more accurately by inputting the operation amounts with larger fluctuation than that upon steady operation.

Restrictions may be provided to a value of the test signal to be input so as not to become a disturbance with respect to the existing control. For example, in the case where the target value of the amount of air which is the set value (target value) of the existing control is changed, individual allocation may be changed without a total amount being changed.

By the test signal being limited to a value within a predetermined range, it is possible to avoid the test signal from becoming an unnecessary disturbance with respect to the plant 1 during operation of the plant 1.

According to the present embodiment, because the test signal is input to the operation amounts of the existing control, the adjusted operation amounts including the test signal are input to the plant 1, and the result becomes the measurement value and is applied to the prediction model. By the test signal being made a value greater than that upon steady operation, it is possible to provide large fluctuation to the plant 1, so that the partial regression coefficients of the linear prediction expression can be obtained more accurately. Therefore, it is possible to improve the reliability of the prediction model.

Further, the test signal is made a value within a predetermined range so as not to become a disturbance with respect to the existing control.

According to the present embodiment, it is possible to avoid the test signal from becoming a useless disturbance during operation of the plant 1, and it is possible to update the prediction model while the plant 1 performs operation.

While the respective embodiments of the present disclosure have been described in detail above with reference to the drawings, a specific configuration is not limited to these embodiments.

For example, while, in the respective embodiments described above, the operation amounts are controlled by constructing the prediction model so as to minimize the monitoring target value (substance such as $NO_x$ which is environmentally regulated), the operation amounts may be controlled by constructing the prediction model so as to maximize the monitoring target value. For example, a prediction model of power generation efficiency may be constructed, and the adjustment amounts of the operation amounts which maximize the power generation efficiency may be calculated. In this manner, according to the present disclosure, it is possible to perform control while calculating the adjustment amounts of the respective operation amounts so as to minimize or maximize the monitoring target value.

REFERENCE SIGNS LIST 1 plant
10 boiler
11 furnace
12 combustion device
21, 22, 23, 24, 25 combustion burner
36 wind box
41 air injection device
70 control device
71 prediction model deriving unit
72 adjustment amount calculating unit
73 constraint condition setting unit
74 operation amount calculating unit
81, 82, 83, 84, 85, 86, 87 regulating valve

What is claimed is:

1. A control device of a plant which controls operation amounts of a plurality of pieces of equipment constituting the plant, the control device comprising:

a prediction model deriving unit that derives a prediction model to which a measurement value measured at the plant is input, and from which a monitoring target value which is a value to be monitored is output;

an adjustment amount calculating unit that calculates the operation amounts of a plurality of pieces of the equipment in a case where the monitoring target value which is to be output becomes a desired value, and calculates differences between the operation amounts of an existing control and the calculated operation amounts as first adjustment amounts;

a constraint condition setting unit that sets a constraint condition of the operation amounts of a plurality of pieces of the equipment based on the measurement value and an operation condition of the plant when the measurement value is measured; and an operation amount calculating unit that calculates second adjustment amounts obtained by correcting the first adjustment amounts by applying the set constraint condition for each of a plurality of pieces of the equipment and calculates a plurality of the adjusted operation amounts based on each of the calculated second adjustment amounts, wherein the operation amount calculating unit calculates a plurality of the adjusted operation amounts based on a plurality of the second adjustment amounts and operation amounts of the existing control and inputs a test signal to the operation amounts of the existing control.

2. The control device of the plant according to claim 1, wherein the prediction model deriving unit derives the prediction model through multiple regression analysis using a linear prediction expression including partial regression coefficients and explanatory variables, the adjustment amount calculating unit calculates the first adjustment amounts of a plurality of the operation amounts based on the partial regression coefficients of the linear prediction expression of the prediction model, and the constraint condition setting unit sets the constraint condition such that a sum of the first adjustment amounts of the operation amounts is fixed.

3. The control device of the plant according to claim 2, wherein the prediction model deriving unit derives the prediction model by selecting one of the explanatory variables having higher correlation than correlation between other explanatory variables and deleting the other of the explanatory variables.

4. The control device of the plant according to claim 2, wherein the prediction model deriving unit calculates a distribution of the partial regression coefficients in a predetermined interval and calculates a credible interval of the prediction model from the distribution of the prediction model based on the distribution of the partial regression coefficients, in a case where a width of the credible interval is equal to or less than a predetermined threshold, the adjustment amount calculating unit calculates the first adjustment amounts using the prediction model, and in a case where the width of the credible interval exceeds the predetermined threshold, the prediction model deriving unit derives a new prediction model in a next predetermined interval.

5. The control device of the plant according to claim 1, wherein the operation amount calculating unit sets the test signal so as to be a value within a predetermined range in which the test signal does not become a disturbance to the existing control.

6. A plant comprising the control device according to claim 1.

7. A control method of a plant which controls operation amounts of a plurality of pieces of equipment constituting the plant, the control method comprising:

a step of deriving a prediction model to which a measurement value measured at the plant is input, and from which a monitoring target value which is a value to be monitored is output;

a step of calculating the operation amounts of a plurality of pieces of the equipment in a case where the monitoring target value which is to be output becomes a desired value, and calculating differences between the operation amounts of an existing control and the calculated operation amounts as first adjustment amounts;

a step of setting a constraint condition of the operation amounts of a plurality of pieces of the equipment based on the measurement value and an operation condition of the plant when the measurement value is calculated; and a step of calculating second adjustment amounts obtained by correcting the first adjustment amounts by applying the set constraint condition, for each of a plurality of pieces of the equipment, and calculating a plurality of the adjusted operation amounts based on each of the calculated second adjustment amounts, wherein the step of calculating the operation amounts calculates a plurality of the adjusted operation amounts based on a plurality of the second adjustment amounts and operation amounts of the existing control and inputs a test signal to the operation amounts of the existing control.

8. A non-transitory computer-readable storage medium storing a control program of a plant which controls operation amounts of a plurality of pieces of equipment constituting the plant, the control program of the plant causing a computer to execute the method comprising:

a step of deriving a prediction model to which a measurement value measured at the plant is input, and from which a monitoring target value which is a value to be monitored is output;

a step of calculating the operation amounts of a plurality of pieces of the equipment in a case where the monitoring target value which is to be output becomes a desired value, and calculating differences between the operation amounts of an existing control and the calculated operation amounts as first adjustment amounts;

a step of setting a constraint condition of the operation amounts of a plurality of pieces of the equipment based on the measurement value and an operation condition of the plant when the measurement value is measured; and a step of calculating second adjustment amounts obtained by correcting the first adjustment amounts by applying the set constraint condition, for each of a plurality of the equipment, and calculating a plurality of the adjusted operation amounts based on each of the calculated second adjustment amounts, wherein the step of calculating the operation amounts calculates a plurality of the adjusted operation amounts based on a plurality of the second adjustment amounts and operation amounts of the existing control and inputs a test signal to the operation amounts of the existing control.

\* \* \* \* \*